United States Patent [19]

Watanabe et al.

[11] Patent Number: 5,371,365
[45] Date of Patent: Dec. 6, 1994

[54] SCANNING PROBE MICROSCOPY

[75] Inventors: Miyoko Watanabe, Yokohama; Koichi Mizushima, Kamakura; Tomio Ono, Yokohama; Tsuyoshi Kobayashi, Tokyo; Satoshi Itoh, Ibaraki, all of Japan

[73] Assignee: Kabushiki Kaisha Toshiba, Kawasaki, Japan

[21] Appl. No.: 11,906

[22] Filed: Feb. 1, 1993

[30] Foreign Application Priority Data

Feb. 3, 1992 [JP] Japan .................................. 4-017743

[51] Int. Cl.⁵ .......................................... H01J 37/252
[52] U.S. Cl. .................................. 250/306; 250/443.1
[58] Field of Search ............... 250/306, 442.11, 443.11

[56] References Cited

U.S. PATENT DOCUMENTS 4,520,570  6/1985  Bednorz et al. .................. 33/180 R
4,772,817  9/1988  Aida et al. ............................ 310/328
5,047,637  9/1991  Toda ...................................... 250/306
5,216,631  6/1993  Sliwa ..................................... 365/151

Primary Examiner—Jack I. Berman
Attorney, Agent, or Firm—Oblon, Spivak, McClelland, Maier & Neustadt

[57] ABSTRACT

There is provided a scanning probe microscopy comprising a probe 6 situated to face the surface of an sample 1, a first piezoelectric element 8 for moving the sample 1 and the probe 6 relative to each other in a first direction perpendicular to the surface of the sample, and second and third piezoelectric elements 3 and 4 for moving the probe and the sample relative to each other in second and third directions perpendicular to the first direction, thereby enabling the probe to scan the surface of the sample, wherein at least one of the first to third piezoelectric elements 8, 3 and 4, which is closest to the sample 1, is formed of a single crystal.

5 Claims, 11 Drawing Sheets

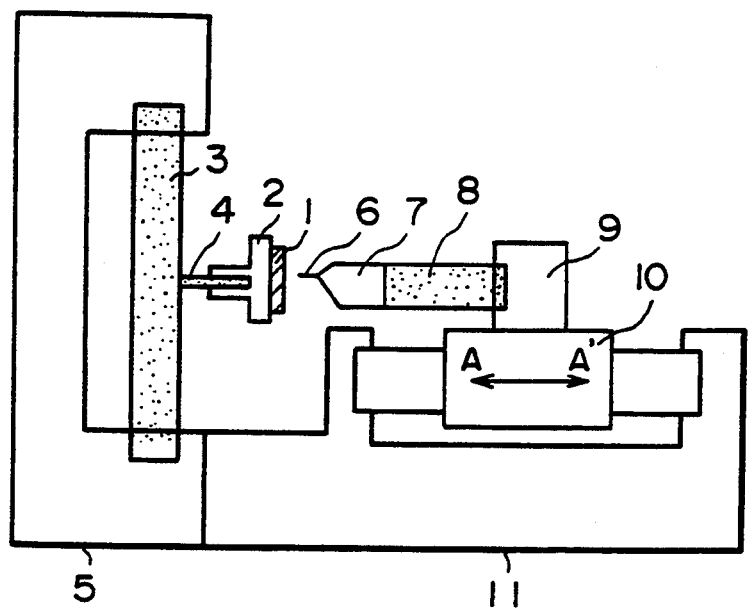
F I G. 1
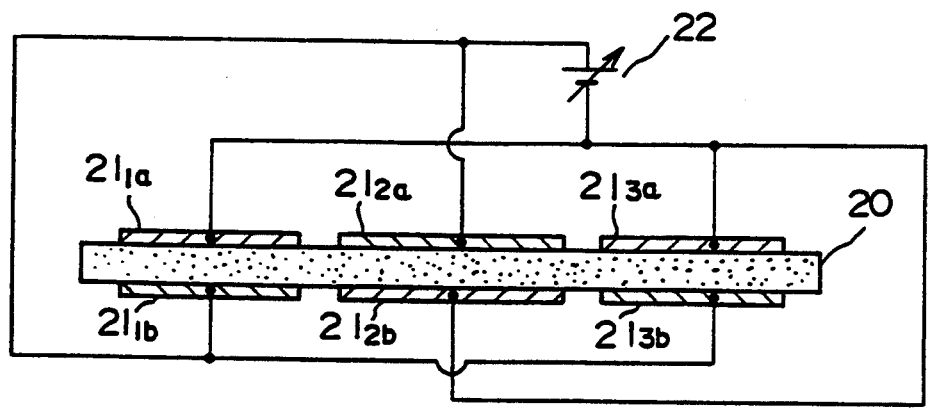
F I G. 2

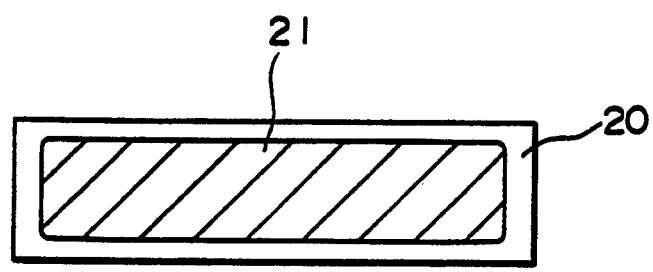
F I G. 7
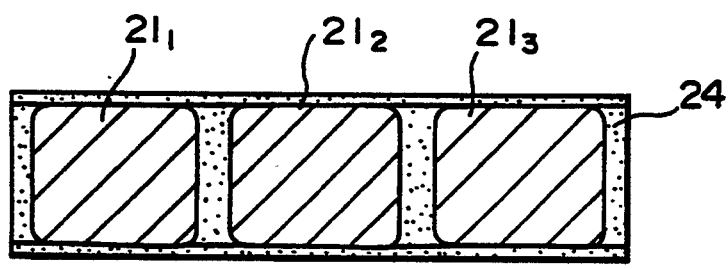
F I G. 8

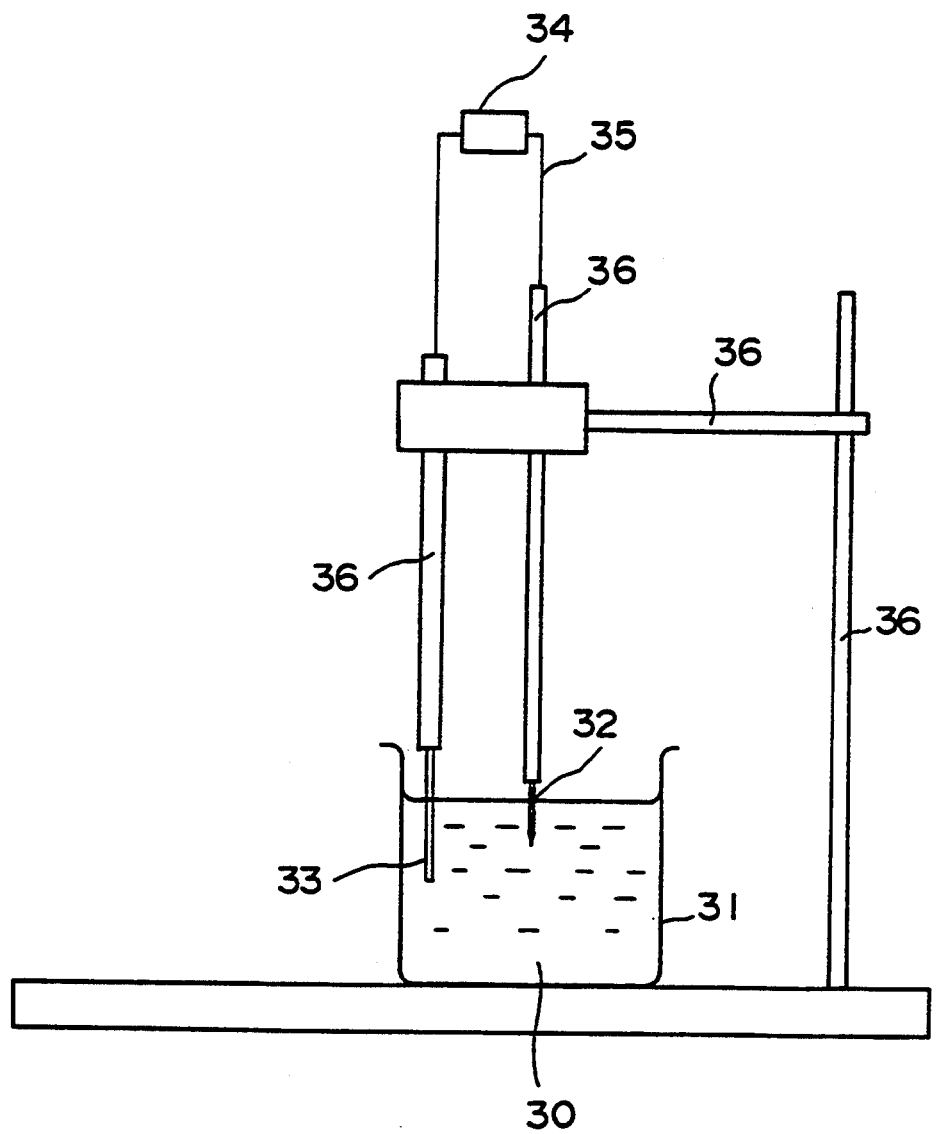
F I G. 9

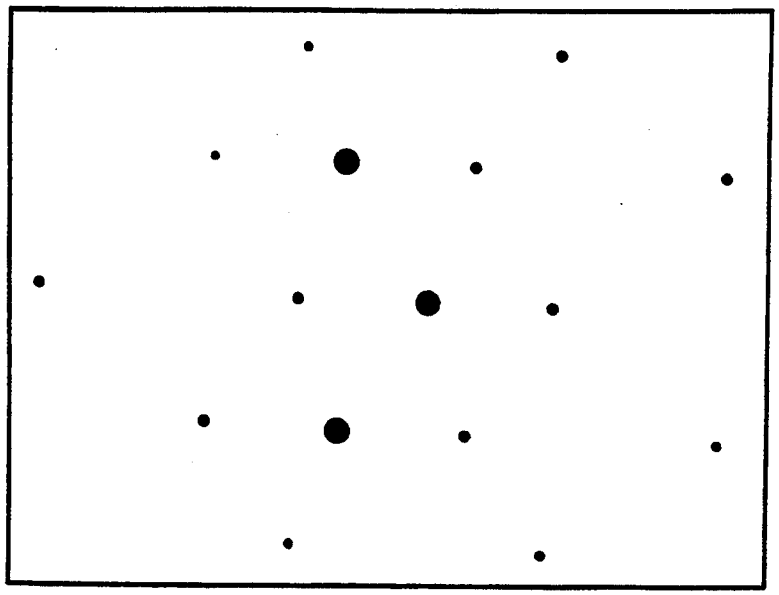
F I G. 10
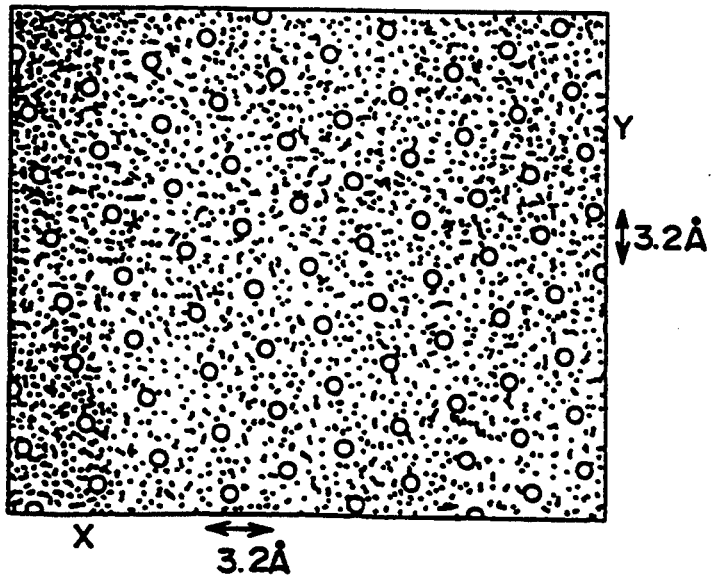
F I G. 11

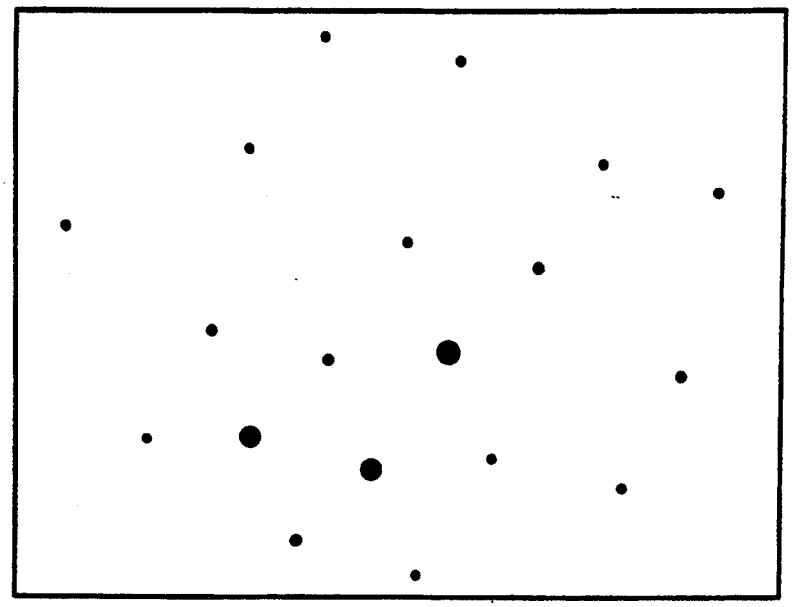
F I G. 12
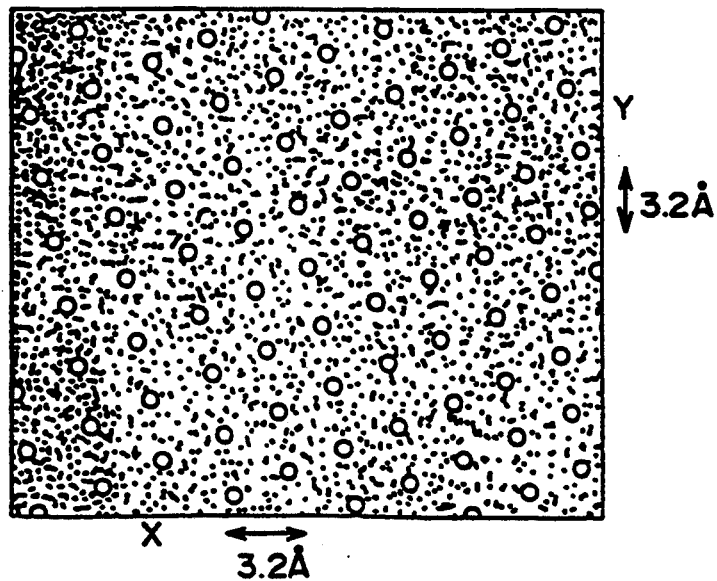
F I G. 13

SCANNING PROBE MICROSCOPY

BACKGROUND OF THE INVENTION

1. Field of the Invention

The present invention relates to a scanning probe microscope used for, e.g., surface measurement, surface treatment and surface processing.

2. Description of the Related Art

Scanning tunneling microscope (to be referred to as STM hereinafter) have recently been developed for observing each atom on the surface of a sample. According to the STM, an electrically conductive probe with a sharp tip is scanned over the surface of an electrically conductive sample. By measuring a tunnel current flowing between the sample and the probe during scanning, a structure of an atomic-level of the surface of the sample can be measured.

The STM is applicable to various uses, other than measurement of surface structure of a sample. For example, after the surface structure is measured, the probe is moved to a desired location on the sample surface and a pulse voltage is applied between the probe and the sample, thereby subjecting a portion just under the probe to atomic-scale fine processing. Further, by striking the probe on the sample surface, a fine recess/projection can be formed on the sample surface. That is, the STM is applicable as a processing apparatus. In addition, when gas molecules or liquid molecules are present between the probe and the sample, the molecules can be absorbed on, or separated from, the sample by an electric field generated by applied voltage. In this case, the STM is used as a surface treatment apparatus.

In the scanning probe microscope including STMs, vibration between the probe and the sample must be reduced as much as possible in order to achieve high resolution. For this purpose, the resonance frequency of the scanning probe microscope must be increased. Further, since the limit of operation speed is determined by the resonance frequency, it is necessary to increase the resonance frequency of the scanning probe microscope in order to achieve high-speed operation. As stated above, the resonance frequency of the scanning probe microscope must be increased to achieve high resolution and high-speed operation, and for this purpose the size of the driving unit of the scanning probe microscope is generally reduced. To reduce the size of the driving unit, a piezoelectric element formed of ceramics is generally used as scanning means for scanning the surface of the sample by the probe. The piezoelectric element is coupled directly to the probe or coupled directly to a sample holder, thereby reducing the size of the driving unit.

When the surface of a sample is measured by this type of scanning probe microscope at high temperatures, the following problems occur.

The piezoelectric element is arranged near the sample. When the sample is heated at high temperatures, the temperature of the piezoelectric element also rises. The piezoelectric element is generally formed of PZT ceramic material, and the Curie temperature of PZT ceramic material is in the range of 200° C. to 400° C. Thus, if the sample is heated at the Curie temperature or above, the temperature of the piezoelectric element is also raised up to the Curie temperature and the piezoelectric element does not operate.

In order to arrange the piezoelectric element at a distance from the probe and sample, a heat buffer may be provided between the piezoelectric element and probe or between the piezoelectric element and sample. Thereby, the piezoelectric element can operate while the sample is heated at high temperatures. In this case, however, the distance between the piezoelectric element and probe or between the piezoelectric element and sample is large, and as a result the resonance frequency of the scanning probe microscope decreases. Consequently, the scanning probe microscope cannot be operated with high resolution and at high speed with the sample heated at high temperatures.

In addition, the resonance frequency is determined not only by the distance between the piezoelectric element and sample and the distance between the piezoelectric element and probe, but also by the weight of members supported by the piezoelectric elements, i.e. a sample holder including the sample and a probe holder including the probe. In order to heat the sample at high temperatures, a heater using as heating means is required and the weight of the load supported by the piezoelectric element is increased. As a result, the resonance frequency of the scanning probe microscope decreases and the resolution and operation speed at high temperatures of the scanning probe microscope further decreases.

It is desired that a probe used in the scanning probe microscope have one atom projecting stably from a tip portion thereof. The material of the probe is generally selected from the group consisting of tungsten, platinum and a platinum/iridium compound. The reason for this is as follows. Of all elements, the melting point of tungsten is highest and most stable, and therefore tungsten is used as material of the probe. Although tungsten is widely used in a high vacuum atmosphere, the surface of a tungsten probe is easily oxidized. Thus, tungsten is not suitable for use in the air. Instead, a platinum probe whose surface is not easily oxidized is suitable for use in the air. Further, by mixing 10% to 20% of iridium in platinum, the hardness of the resultant compound is increased. Thus, a platinum/iridium compound is widely used. Furthermore, since it is important that the material of the probe is free from surface oxidation in the air, it is reported that rhenium oxide which is an oxide and has high electrical conductivity is used as material of the probe.

Even where any of the above materials is used for the probe, however, the atom at the tip of the probe is unstable. In fact, there is always a problem that the resolution of an STM image varies during STM measurement. There is no case where the resolution does not vary over several minutes. It is understood that this is due to constant movement of the atom at the probe tip.

As has been stated above, in the conventional scanning probe microscope, the temperature of the piezoelectric element rises if the sample is heated at high temperatures, and the piezoelectric element does not operate if its temperature exceeds the Curie point. Further, if the distance between the piezoelectric element and sample or between the piezoelectric element and probe is increased to prevent temperature rise of the piezoelectric element, the resonance frequency decreases and the high resolution and high-speed operation cannot be achieved.

Furthermore, in the conventional scanning probe microscope, the resolution varies constantly and high resolution is not stably obtained.

In addition, when the scanning probe microscope is applied to very fine processing, the processing is controlled only by controlling voltage across the probe and the sample. However, voltage control is not sufficient for controlling very fine processing in which atoms or molecules are transferred between the probe and sample. More excellent control means is desired.

Techniques relating to the present invention are disclosed in K. Nakamura et al., Jpn. J. Appl. Phys. Vol. 26, pp. 198-200, 1987 and S. Ikebe et al., Jpn. J. Appl. Phys. Vol. 30, pp. L405-406, March, 1991. Further, there are U.S. Pat. No. 5,148,026 and U.S. Pat. No. 5,089,740.

SUMMARY OF THE INVENTION

A first object of the present invention is to provide a scanning probe microscope capable of performing high-resolution, high-speed operation, even if a sample is heated at high temperatures, and capable of applying a high voltage without electric discharge.

A second object of the invention is to provide a piezoelectric element for a scanning probe microscope capable of achieving stable, high resolution.

A third object of the invention is to provide a scanning probe microscope capable of performing very fine processing with high controllability.

In order to achieve the above objects, the present invention provides the following means.

A first scanning probe microscope of the invention may comprise, as driving means, a first piezoelectric element for moving the sample and a probe relative to each other in a first direction (to be referred to as "Z-direction" hereinafter) perpendicular to the surface of the sample, and second and third piezoelectric elements for moving the probe and the sample relative to each other in second and third directions (to be referred to as "X-direction" and "Y-direction" respectively hereinafter) perpendicular to the first direction, thereby enabling the probe to scan the surface of the sample. It is effective that at least one of the first to third piezoelectric elements, which is closest to the sample, is formed of a single crystal.

Desirable modes of the first scanning probe microscope of the invention:

(1) The single crystal piezoelectric element is formed of lithium niobate or lithium tantalate.
(2) The single crystal piezoelectric element is of a bimorph type.
(3) The piezoelectric elements for X- and Y-directional movement (hereinafter to be referred to as "X-piezoelectric element" and "Y-piezoelectric element", respectively) are provided for the sample, and the piezoelectric element for Z-directional movement (to be referred to as "Z-piezoelectric element" hereinafter) is provided for the probe.
(4) Heating means is provided and is constituted by a heater mounted on a sample holder for holding the sample.
(5) The heating means is constituted by light radiation means for radiating light on the surface of the sample.
(6) The heating means is constituted by a graphite pattern provided on the surface of the sample holder and boron nitride (BN) arranged between the sample holder and the sample.

Further, it is desirable that the first scanning probe microscope employ any one of the following means:

(i) The electrodes of at least one of the single crystal piezoelectric elements are isolated by a plurality of crystal surface portions;
(ii) The crystal surface portions between electrodes are coated with an insulating material; and
(iii) The roughness of the surface portions between the electrodes is increased by surface treatment.

The first, second and third piezoelectric elements may be integrated on a single piezoelectric body with two or more pairs of electrodes provided thereon, or may be formed independently. These piezoelectric elements may be provided for the probe or for the sample.

According to the first scanning probe microscope of the present invention, a single crystal is employed as material of the piezoelectric element. The Curie point of the single crystal material is higher than that of ceramic material such as PZT. The Curie point of a lithium niobate crystal is about 1150° C. Even if the temperature of the lithium niobate crystal is raised to several hundred ° C., the piezoelectric characteristics thereof hardly change. However, a single crystal such as a lithium niobate crystal has a lower displacement sensitivity than PZT ceramic material. Thus, it is desirable to use a bimorph type piezoelectric element having a greater displacement, even when the same piezoelectric material is used. If the bimorph type piezoelectric element obtained by subjecting the lithium niobate single crystal to heat treatment is used, the piezoelectric characteristics of the piezoelectric element are substantially equal to those obtainable at room temperature even when the heater serving as a sample holder is directly connected to the piezoelectric element and the sample is heated by the heater. The operation characteristics of the piezoelectric element are constant, irrespective of temperatures. Further, since the sample holder is directly connected to the piezoelectric element, the resonance frequency of the apparatus is kept at a high level.

In the first scanning probe microscope of the present invention, the sample holder including the sample and heater having a large mass may be connected to the X- and Y-piezoelectric elements, and the probe and probe holder having a mass which can be decreased may be connected to the Z-piezoelectric element. Thereby, the operation speed of the scanning probe microscope can be increased. That is, while the sample-side unit is slowly moved in the X- and Y-directions, the probe can be quickly moved in the Z-direction and high-speed gap length control can be achieved. As a result, even if the sample is heated at high temperatures, high-resolution, high-speed operation can be achieved.

In addition, according to the first scanning probe microscope, the surface of the single crystal piezoelectric material of the piezoelectric element is less rough and flatter than ceramic material such as PZT. Thus, if the inter-electrode distance is set in the same manner with the ceramic element, an electric discharge may easily occur by application of high voltage. However, an electric discharge does not easily occur by application of high voltage across electrodes, by employing any one of the means: (i) The electrodes of the single crystal piezoelectric elements are isolated by a plurality of crystal surface portions; (ii) The crystal surface portions between electrodes are coated with an insulating material; and (iii) The roughness of the surface portions between the electrodes is increased by surface treatment.

According to the first scanning probe microscope of the present invention, even when the sample is heated at high temperatures, high-resolution and high-speed operation can be achieved, and an electric discharge does not easily occur by application of high voltage across electrodes.

As described above, according to the first scanning probe microscope of the present invention, the piezoelectric elements for driving the probe and sample are formed of a single crystal piezoelectric material with a high Curie temperature such as lithium niobate or lithium tantalate. Thus, even when the sample is heated at high temperatures, high-resolution and high-speed operation can be achieved. Moreover, in a microscope for keeping the gap length between the sample and the probe constant, a piezoelectric element formed of a lithium niobate single crystal is used, and a plurality of crystal surface portions are provided between electrodes of the piezoelectric element, or surface treatment is conducted to increase the roughness of the surface portions, or the surface portions are coated with an insulating material. Thereby, leak current between electrodes can be prevented and an electric discharge can be prevented.

A second scanning probe microscope according to the present invention comprises a probe situated to face the surface of an sample, and driving means for moving the sample and the probe relative to each other in a Z-direction perpendicular to the surface of the sample and moving the probe and the sample relative to each other in X- and Y-directions perpendicular to the Z-direction, wherein the probe is formed of any one selected from the group consisting of rhenium, a compound of rhenium and one of a transition metal, a Group III element such as boron, a Group IVB element such as carbon and silicon, and a Group VB element such as nitrogen and phosphorus (e.g. Re-W compound, rhenium silicide), osmium, an osmium compound (e.g. Os-W compound, osmium silicide), and lanthanum boride.

According to the second scanning probe microscope of the present invention, the probe is formed of any one selected from the group consisting of rhenium, a compound of rhenium and one of a transition metal, a Group IIIB element, a Group IVB element and a Group VB element (e.g. Re-W compound, rhenium silicide), osmium, an osmium compound (e.g. Os-W compound, osmium silicide), and lanthanum boride.

As physical constants indicating the stability of atoms at the tip of the probe, there are a melting point and an inter-atomic distance, which determine the possibility of breaking of inter-atomic bond. The stability of atoms is higher, as the melting point increases and the inter-atomic distance decreases. Thus, the value of melting point/lattice constant is employed as a parameter indicating the stability of atoms at the tip of the probe. The higher the value, the higher the stability. The values of melting point/lattice constant of conventional probe materials and high-melting-point

| | |
|---|---|
| tungsten | 1165K/angstrom |
| platinum | 522K/angstrom |
| rhenium oxide | 413K/angstrom |
| rhenium | 1260K/angstrom |
| osmium | 1204K/angstrom |
| tantalum | 996K/angstrom |
| molybdenum | 917K/angstrom |
| niobium | 830K/angstrom |

From the above, it is understood that rhenium and osmium are more stable than tungsten. Compounds using these elements, too, are thermally stable. For example, rhenium silicide is a desirable probe material.

Regarding compounds, lanthanum boride having a low work function of about 2.5 eV is generally used as material of an electron gun. The lanthanum boride used for the electron gun has a high electron discharge density than tungsten, and it is stable for a long time. Accordingly, lanthanum boride is more suitable than tungsten as probe material of the scanning probe microscope. According to the second scanning probe microscope of the present invention, the probe is formed of any one selected from the group consisting of rhenium, a compound of rhenium and one of a transition metal, a Group IIIB element, a Group IVB element and a Group VB element (e.g. Re-W compound, rhenium silicide), osmium, an osmium compound (e.g. Os-W compound, osmium silicide), and lanthanum boride, and the scanning is performed with stable atoms at the tip of the probe. Thus, stable and high-resolution operation can be achieved.

As described above, the second scanning probe microscope can achieve stable and high-resolution operation by using rhenium, osmium, a compound metal of rhenium or osmium, a semiconductor material, or lanthanum boride as probe material.

A third scanning probe microscope according to the present invention comprises a probe arranged to face the surface of an sample, and driving means for moving the sample and the probe relative to each other in a Z-direction perpendicular to the surface of the sample and moving the probe and the sample relative to each other in X- and Y-directions perpendicular to the Z-direction, wherein the scanning probe microscope further comprises first heating means for heating the sample and second heating means for heating the probe.

According to the third scanning probe microscope of the present invention, the scanning probe microscope comprises the first heating means for heating the sample and the second heating means for heating the probe, so that the sample and probe are heated independently.

Conventional very fine processing techniques using a scanning probe include a method in which a probe is struck on the surface of a sample and a method in which atoms are evaporated by strong electrolysis. These methods, however, have low controllability, and the element of the probe material is mixed in the sample, thus degrading characteristics of the sample. On the other hand, there is a method with higher controllability in which atoms are moved by making use of chemical bond between atoms on a substrate and a probe. This method, however, can be carried out only at very low temperatures with respect to atoms with very weak interaction between the substrate and probe, such as noble gas atoms.

In order to perform very fine processing on a general sample with high controllability, it is desirable that atomic material be moved between the sample and the probe by a gentle method, without collision utilizing chemical bond or strong electrolysis, as mentioned above.

In this case, the temperatures of the probe and sample are varied independently, thereby controlling the inter-atomic bonding force in the sample and the bonding force between the probe and atoms. In addition, atomic movement due to temperature difference between the probe and sample is utilized. Thus, atomic movement between the probe and sample can be achieved by weak electrolysis with high controllability.

According to the third scanning probe microscope of the present invention, since the heating means are provided for independently controlling the temperature of the sample and the temperature of the probe, very fine processing can be performed with high controllability.

In addition, according to the third scanning probe microscope, since the heating means are provided for independently controlling the temperature of the sample and the temperature of the probe, very fine processing based on atomic or molecular operations can be performed with high controllability, only by applying a low voltage between the sample and the probe.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a cross-sectional view showing the structure of a main part of a scanning probe microscope according to a first embodiment of the present invention;

FIG. 2 shows electrodes and wiring of an X- and Y-directional movement piezoelectric elements according to the first embodiment;

FIG. 7 is a plan view showing an example of electrodes of a Z-directional movement piezoelectric element of the scanning probe microscope according to the invention;

FIG. 8 is a plan view showing a modification of the electrodes shown in FIG. 5B of X- and Y-directional movement piezoelectric elements of the scanning probe microscope according to the invention;

FIG. 9 is a schematic diagram showing an electropolishing apparatus for manufacturing a rhenium probe of a scanning probe microscope according to a second embodiment of the invention;

FIG. 10 shows an FIM image of the rhenium probe according to the second embodiment;

FIG. 11 shows an STM measurement image of a graphite sample obtained by a scanning tunneling microscope with the rhenium probe according to the second embodiment being used;

FIG. 12 shows an FIM image of an osmium probe according to the second embodiment of the invention;

FIG. 13 shows an STM measurement image of a graphite sample obtained by the scanning tunneling microscope with the osmium probe according to the second embodiment being used;

Detailed Description of the Preferred Embodiments

Figure 3:
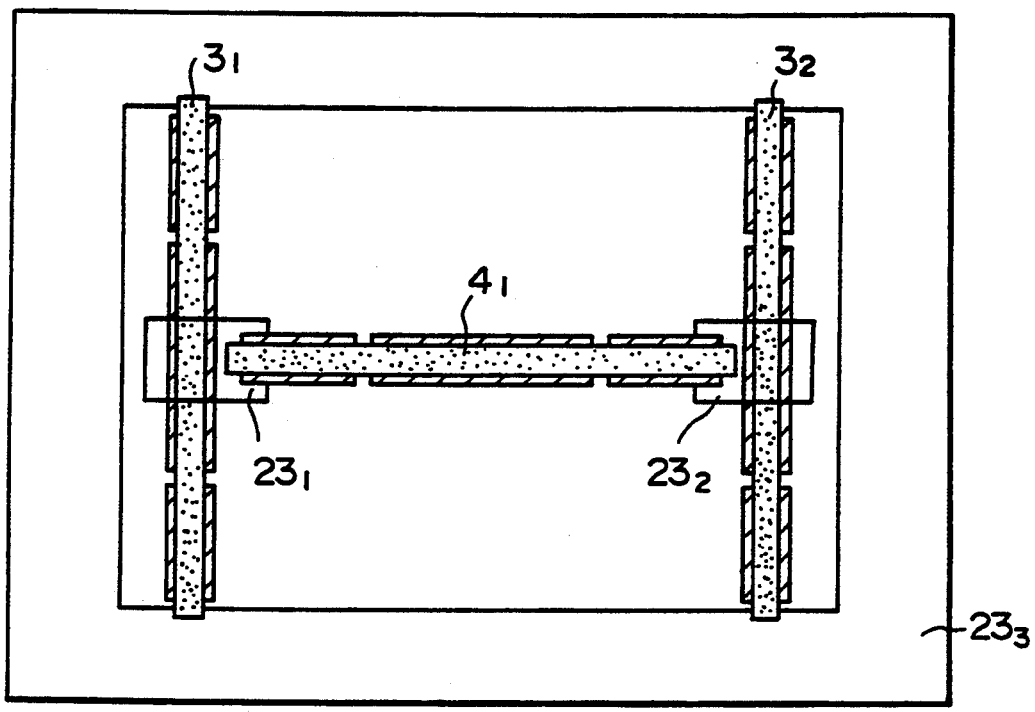
FIG. 3 shows an example of arrangement of the X- and Y-directional movement piezoelectric elements according to the first embodiment.

Embodiments of the present invention will now be described with reference to the accompanying drawings.

FIG. 1 is a cross-sectional view showing the structure of a main part of a scanning probe microscope according to a first embodiment of the present invention. FIG. 1 shows in detail a probe holder including a probe, a sample holder 2 including a sample 1, an X-directional movement piezoelectric element (to be referred to as "X-piezoelectric element" hereinafter), a Y-direction movement piezoelectric element (to be referred to as "Y-piezoelectric element" hereinafter) and a Z-directional movement piezoelectric element (to be referred to as "Z-piezoelectric element" hereinafter).

In FIG. 1, the sample 1 is set on the sample holder 2 serving also as a heater. The sample holder 2 is constructed such that a graphite pattern with a thickness of 50 $\mu$m, which is a heating source, is deposited on a BN (boron nitride) substrate, and a BN layer with a thickness of 50 $\mu$m is deposited on the entire surface of the substrate for electrical insulation from the sample 1. The resistance value of the heater is 150 $\Omega$. The sample holder 2 is coupled to a base 5 made of macor via a Y-piezoelectric element 4 and an X-piezoelectric element 3.

A probe 6 made of tungsten is situated to face the sample 1. The probe 6 is set on a probe holder 7 made of macor. The probe holder 7 is coupled to a piezoelectric element holder 9 made of macor via a Z-piezoelectric element 8. The Z-piezoelectric element 8, like the X- and Y-piezoelectric elements 3 and 4, is obtained by cutting out a wafer with a thickness of 0.5 mm from a lithium niobate single crystal. The cutout wafer has a 140°-rotated Y-plane. However, unlike the X- and Y-piezoelectric elements 3 and 4, the wafer of the Z-piezoelectric element 8 is not subjected to heat treatment and it has no inverted polarization. Thus, the Z-piezoelectric element has a transverse effect. Eight wafers of this type are laminated, and the surface of each wafer is provided with silver electrodes. The electrodes are bonded by baking.

The piezoelectric element holder 9 is mechanically coupled to an inchworm 10 which functions as a rough movement mechanism. The inchworm 10 is mounted on an inchworm fixing unit 11 so as to be movable in the direction of arrow A-A'. The inchworm fixing unit 11 is secured to the base 5.

Although not shown in FIG. 1, the scanning probe microscope further comprises a mechanism for applying a bias voltage across the sample 1 and probe 6, an amperemeter for detecting a tunnel current flowing between the sample 1 and probe 6, a control circuit for controlling a voltage applied to the Z-piezoelectric element so that the measured value of the amperemeter may be constant, a memory for storing data on the controlled voltage applied to the Z-piezoelectric element as well as on the voltages applied to the X- and Y-piezoelectric elements 3 and 4, etc.

In the scanning probe microscope, both piezoelectric elements 3 and 4 are formed by subjecting a lithium niobate single crystal to heat treatment. Specifically, these elements 3 and 4 were obtained in the following manner.

A wafer of 140°-rotated Y-plane with a thickness of 0.5 mm was cut out from a lithium niobate single crystal. The wafer was annealed for ten hours at 1120° C. in a $N_2$ atmosphere. Thereby, an inverted polarization layer was formed in a half portion of the wafer in the thickness direction. In order to confirm the presence of the inverted polarization layer, the wafer was immersed in a solution of hydrofluoric acid and nitric acid in a mixture ratio of 1:2. The solution was heated up to its boiling point, and the wafer was immersed for about 10 minutes and etched. As a result, a boundary between the inverted polarization layer and the original layer was found at a substantially center point of the wafer, and it was confirmed that an almost half portion of the wafer in the thickness direction was polarization-inverted. The heat treatment for the lithium niobate single crystal was tried under conditions other than the above. When the heat treatment was conducted in an atmosphere other than $N_2$ atmosphere, the same results were obtained. Further, when the heat treatment temperature was increased from 1050° C. to 1170° C., and when the heat treatment time was varied between 1 hour and 10 hours, the same results were obtained. The size of the wafer was 5 mm×15 mm.

FIG. 2 shows the structure and wiring of electrodes formed on the lithium niobate single crystal, which was subjected to the above-described heat treatment.

Referring to FIG. 2, three pairs of electrodes, $21_{1a}$ and $21_{1b}$, $21_{2a}$ and $21_{2b}$, $21_{3a}$ and $21_{3b}$, are provided on both surfaces of a lithium niobate single crystal plate 20 which was subjected to the above-described polarization treatment. DC voltages are applied to each pair of electrodes ($21_{1a}$–$21_{1b}$; $21_{2a}$–$21_{2b}$; $21_{3a}$–$21_{3b}$). The direction in which the voltage is applied across the center electrodes $21_{2a}$ and $21_{2b}$ is opposite to the direction in which the voltages are applied across the other electrodes $21_{1a}$–$21_{1b}$ and $21_{3a}$–$21_{3b}$.

Piezoelectric elements manufactured as described above were used as piezoelectric elements 3 and 4 on the sample 1 side in FIG. 1, and X- and Y-directional driving systems of the scanning probe microscope were assembled.

FIG. 3 shows the X- and Y-directional driving systems assembled by using the above elements. As shown in FIG. 3, the X-piezoelectric element 3 comprises two heat-treated lithium niobate plates $3_1$ and $3_2$, and the Y-piezoelectric element 4 comprises one heat-treated lithium niobate plate $4_1$. The X-piezoelectric element 3 is supported by an X-piezoelectric element holding unit $23_3$, and the Y-piezoelectric element 4 is supported by Y-piezoelectric element holding units $23_1$ and $23_2$.

The degrees of shrinkage of the piezoelectric elements of the above scanning probe microcope in the X-, Y- and Z-directions were measured. The degrees of shrinkage in the X- and Y-directions were 2 nm/v, respectively, and the degree of shrinkage in the Z-direction was 0.5 nm/V. The resonance frequencies in the X-, Y- and Z-directions were 5 kHz, 4 kHz and 80 kHz, respectively.

In the scanning probe microscope having the above structure, graphite sample 1 was set on the sample holder 2 and the scanning probe microscope was operated.

The inchworm 10 was driven to approach the probe 6 to the surface of the sample 1 until a tunnel current began to flow. Then, a current of 1A was caused to flow to the heater of the sample holder 2. The surface temperature of the sample 1 increased to 700° C. In this state, a triangular wave current with amplitude of 2 V and frequency of 1 kHz was supplied to the X-piezoelectric element 3, and a rectangular wave current with amplitude of 2 V and frequency of 7.8 kHz was supplied to the Y-piezoelectric element 4. Thus, STM measurement was performed. Specifically, a rectangular region of 4 nm×4 nm was measured by a so-called raster scan method. The time needed for one-screen measurement was 0.13 second. In the measurement, the bias voltage applied to the sample 1 was set at 0.5 V, and the tunnel current was set at 1 nA.

Figure 4A:
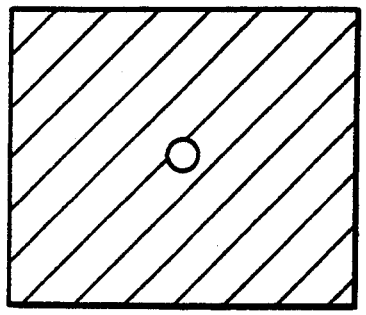
FIGS. 4A to 4D are diagrams showing STM measurement images obtained by the microscope of the first embodiment.
Figure 4B:
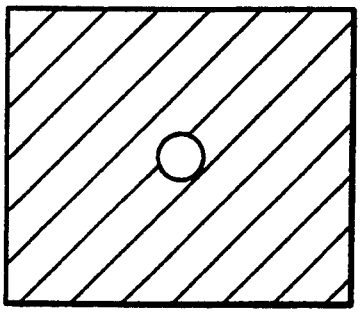
Figure 4C:
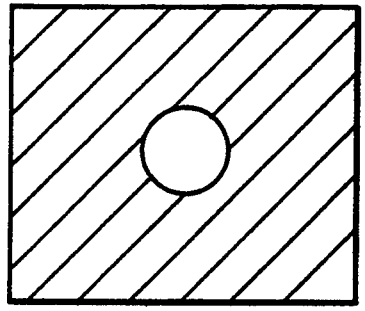
Figure 4D:
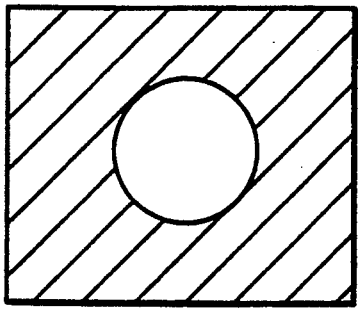

While the measurement was performed under the above conditions, a voltage of 10 V was applied one time for 10 ns when the probe 6 has reached the center of the surface of the sample 1. FIG. 4A shows an STM measurement image obtained following the application of the high voltage, and FIGS. 4B, 4C and 4D show STM measurement images obtained successively. When these STM images are compared, it is understood that real-time measurement was performed on the process in which a cluster of about 10 atoms was formed on the surface of sample 1 by application of high voltage and the cluster atoms were dispersed with the passing of time.

As has been described above, according to the first embodiment, the sample holder 2 (i.e. a greater mass part) serving as heater is connected directly to the X- and Y-piezoelectric elements 3 and 4, and the probe holder 7 (i.e. a less mass part) is connected to the Z-piezoelectric element 8. Thus, while the sample 1 is slowly scanned, the probe 6 can be driven quickly in the Z-direction, and surface measurement, etc. of the sample 1 can be effectively performed. In addition, since the piezoelectric elements 3, 4 and 8 are formed of the lithium niobate single crystal, even if the sample 1 is heated at high temperatures, there is no problem in which the piezoelectric elements 3, 4 and 8 do not operate. Accordingly, while the sample 1 is heated at high temperatures, high-resolution and high-speed operation can be achieved.

In the case where the single-crystal piezoelectric elements having the Curie point of 1000° C. or above are used, as in the first embodiment, the operation of the piezoelectric elements is not affected even when the piezoelectric elements are heated at high temperatures of 1000° C. or less. Thus, the piezoelectric elements may be arranged near the sample and probe, and high-resolution, high-speed, and high-temperature STM measurement can be achieved with high resonance frequency. In this case, however, a new problem of electrodes arises. Since an ordinary PZT ceramic piezoelectric element has a considerable surface roughness, an inter-electrode distance of 1 mm is sufficient with respect to application of 1 kV, and there occurs no inter-electrode leak current or discharge. In the case of a single crystal, however, an inter-electrode area is flat with constant atomic level and has a shorter effective inter-electrode distance than the ceramic element. In addition, not only the effective inter-electrode distance is shorter, but also there is a problem in the case of a single crystal element in which an adhered impurity is not fixed on the flat area and an electric discharge easily occurs by application of interelectrode high voltage.

In order to solve the above problems, the piezoelectric elements were provided with a structure different from that of the first embodiment. The principal structure of the scanning probe microscope is common to that shown in FIG. 1, and so a description thereof is omitted.

In the scanning probe microscope having the structure shown in FIG. 1, the X- and Y-piezoelectric elements 3 and 4 were manufactured in the following manner.

As with the first embodiment, a wafer of 140°-rotated Y-plane with a thickness of 0.5 mm was cut out from a lithium niobate single crystal. Unlike the first embodiment, the surface of the lithium niobate single crystal was polished such that roughness of about 20 $\mu$m remained. The heat treatment carried thereafter was the same as that in the first embodiment, as will be described below.

A wafer of 140°-rotated Y-plane with a thickness of 0.5 mm was cut out from a lithium niobate single crystal. The wafer was annealed for ten hours at 1120° C. in a N$_2$ atmosphere. Thereby, an inverted polarization layer was formed in a half portion of the wafer in the thickness direction. In order to confirm the presence of the inverted polarization layer, the wafer was immersed in a solution of hydrofluoric acid and nitric acid in a mixture ratio of 1:2. The solution was heated up to its boiling point, and the wafer was immersed for about 10 minutes and etched. As a result, a boundary between the inverted polarization layer and the original layer was found at a substantially center point of the wafer, and it was confirmed that an almost half portion of the wafer in the thickness direction was polarization-inverted. The heat treatment for the lithium niobate single crystal was tried under conditions other than the above. When the heat treatment was conducted in an atmosphere other than N$_2$ atmosphere, the same results were obtained. Further, when the heat treatment temperature was increased from 1050° C. to 1170° C., and when the heat treatment time was varied between 1 hour and 10 hours, the same results were obtained. The size of the wafer was 5 mm×15 mm.

Figure 5A:
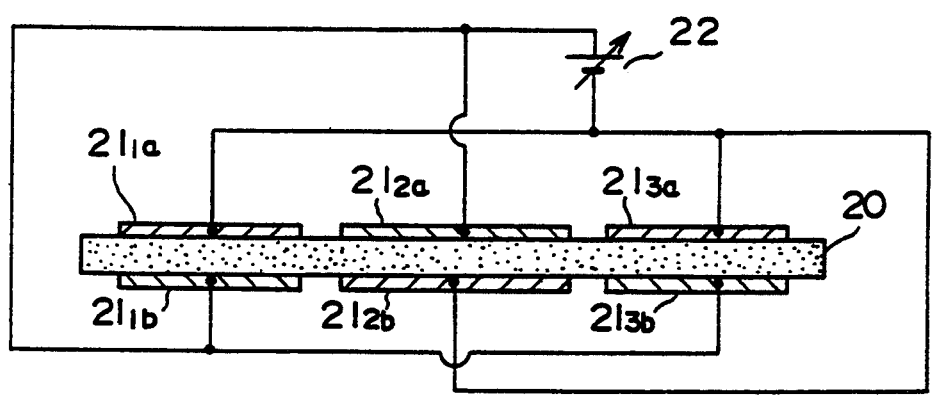
FIGS. 5A and 5B show an example of electrodes of the X- and Y-directional movement piezoelectric elements of the scanning probe microscope according to the invention.
Figure 5B:
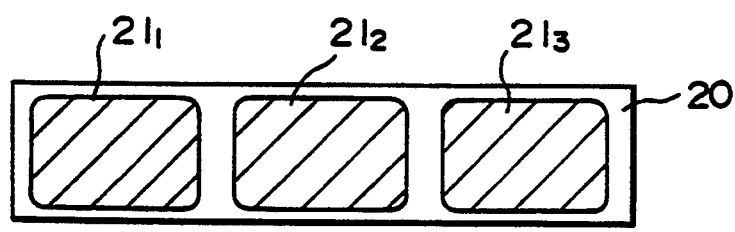

FIG. 5A shows the structure and wiring of electrodes formed on the lithium niobate single crystal, which was subjected to the above-described heat treatment. Electrodes were formed such that a silver paste was coated and heated at 80° C. for one hour and then baked by heat treatment at 120° C. for one hour. FIG. 5B is a plan view of a piezoelectric element. Referring to FIG. 5B, electrodes 21$_1$ to 21$_3$ were separated from the end faces by 0.5 mm. The inter-electrode distance on the same wafer surface is 1 mm. The corners of the electrodes 21 were rounded with the radius of curvature of 2 mm, in order to prevent concentration of electrolysis.

Figure 6:
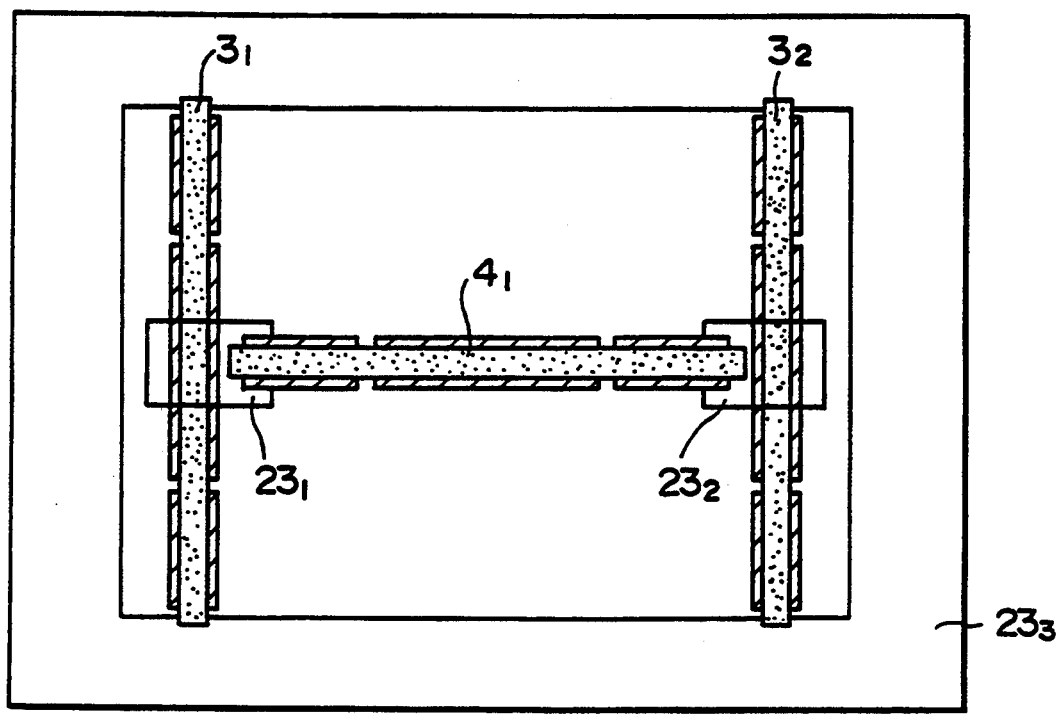
FIG. 6 shows assembly of the X- and Y-directional movement piezoelectric elements of the scanning probe microscope according to the invention.

The piezoelectric element shown in FIGS. 5A and 5B was used as X- and Y-piezoelectric elements 3 and 4 for the sample 1 shown in FIG. 1. Thus, X- and Y-directional driving systems were assembled, as shown in FIG. 6. The structure shown in FIG. 6 is the same as that shown in FIG. 3, and so a description thereof is omitted.

The Z-piezoelectric element 8 was formed by cutting out a wafer of 140°-rotated Y-plane with a thickness of 0.5 mm from a lithium niobate single crystal. The size of the wafer was 5 mm×20 mm. The electrode was formed such that a silver paste was coated and heated at 80° C. for one hour and then baked by heat treatment at 120° C. for one hour. As shown in FIG. 7, the electrode 21 was separated from the end faces of the single crystal 20 by 0.5 mm. The corners of the electrode 21 were rounded with the radius of curvature of 2 mm.

All piezoelectric elements used in this embodiment were formed by cutting out a wafer of 140°-rotated Y-plane from a lithium niobate single crystal ingot. The surfaces of the elements were subjected to surface treatment so that roughness of about 5 $\mu$m remains. Thus, the inter-electrode areas on the same surface have roughness of about 5 $\mu$m.

The degrees of shrinkage of the piezoelectric elements of the above scanning probe microscope in the X-, Y- and Z-directions were measured. The degrees of shrinkage in the X- and Y-directions were 12 nm/V, respectively, and the degree of shrinkage in the Z-direction was 0.5 nm/V. The resonance frequencies in the X-, Y- and Z-directions were 5 kHz, 4 kHz and 80 kHz, respectively.

Using the above scanning probe microscope, a voltage of 1 kv was applied to the X-, Y- and Z-piezoelectric elements for 50 hours. There occurred no electric discharge between the electrodes, and a leak current was 1 nA or less.

The above scanning probe microscope was operated while a graphite sample 1 was set. A current of 1 A was supplied to the heater. The surface temperature of the sample 1 increased to 700° C. In this state, a triangular wave current with amplitude of 2 V and frequency of 1 kHz was supplied to the X-piezoelectric element, and a rectangular wave current with amplitude of 2 V and frequency of 7.8 kHz was supplied to the Y-piezoelectric element. Thus, STM measurement was performed. The time needed for one-screen measurement was 0.13 second. In the measurement, the bias voltage applied to the sample 1 was set at 0.5 V, and the tunnel current was set at 1 nA. While the measurement was performed under the above conditions, a voltage of 10 V was applied one time for 10 ns when the probe 6 has reached the center of the surface of the sample 1. As a result, the same images as shown in FIGS. 4A to 4D were obtained. Specifically, it is understood that real-time measurement was performed on the process in which a cluster of about 10 atoms was formed on the surface of sample 1 by application of high voltage and the cluster atoms were dispersed with the passing of time.

In the above embodiment, the size of the electrode was less than that of the lithium niobate wafer and the corners of the electrode were rounded. However, as shown in FIG. 8, it is possible to extend the electrodes 21 to the end faces of the crystal surface and coating the inter-electrode areas with an epoxy adhesive (i.e. insulating material 24), thereby preventing interelectrode discharge.

The piezoelectric elements having the structure shown in FIG. 8 were assembled in the same manner shown in FIG. 6, and a voltage of 1 kV was applied to the elements for five hours. A leak current of 1 nA or above did not flow, and no electric discharge occurred.

A second embodiment of the scanning probe microscope of the present invention will now be described. The principal structure of the second embodiment is the same as that of the first embodiment, and so a description thereof is omitted.

The second embodiment is characterized by forming the probe of an optimal material.

A first probe was formed of rhenium in the following manner.

The rhenium probe was formed by electropolishing. FIG. 9 shows a schematic structure of an electropolishing apparatus. The electropolishing apparatus comprises a beaker 31 for containing an electrolyte 30 for electropolishing, a reference electrode 33 used to polish a rhenium wire 32, a power supply 34 for supplying electric power for electropolishing, lines 35 for connecting the power supply 34 to the reference electrode 33 and connecting the power supply 34 to the rhenium wire 32, and frames 36 for coupling and fixing the respective parts.

In the electropolishing apparatus with the above structure, the rhenium wire 32 having a diameter of 0.3 mm was put in the electrolyte 30 of $12NH_2SO_4$. A voltage of 10 V was applied between the rhenium wire 32 and the reference electrode 33, and electropolishing was performed. After about one minute, a tip portion of the wire 32 was pointed, and the wire 32 was taken out of the electrolyte 30. With the rhenium probe used as sample 1, the atoms at the tip of the probe were observed by an field ion microscope (to be referred to as FIM hereinafter) by using He gas. Then, 6th symmetric (100) plane was observed, and it was found that six atoms at the tip of the probe existed. Further, voltage was applied to electrolytically evaporate part of the surface atoms, and three atoms were left at the tip of the probe. An FIM image obtained at that time was shown in FIG. 10. The FIM apparatus is directly coupled to the STM, and it can transfer the probe to the STM in a very high vacuum atmosphere, without exposing the probe to the air.

The probe manufactured in the above-described process was set as probe 8 (FIG. 1) on the scanning probe microscope, and normal STM measurement was performed with a graphite sample used as sample 1. As a result, an STM atom image shown in FIG. 11 was measured over 60 minutes with no change. The fact that the resolution of the image did not change at all means that the atoms at the tip of the probe were stable.

In addition, after the measurement, a current of 1.2 A was supplied to the heater 2 shown in FIG. 1 and STM measurement was carried out with the graphite sample 1 kept at 520° C. As a result, the heat drift was high and 3 nm/min, as compared to 0.5 nm/min measured at room temperature. However, an STM image was measured over 30 minutes with no change. This means that the STM measurement was performed at high temperature of 520° C. while the atoms at the tip of the probe were stable during scanning.

A second probe was formed of osmium in the following manner.

The tip of the osmium probe could not be pointed by electropolishing, and it was mechanically polished by means of a grinder. Using the osmium probe as sample 1, the atoms at the tip of the probe were observed by a FIM by using He gas. Then, like the rhenium probe, 6th symmetric (100) plane was observed. Further, voltage was applied to electrolytically evaporate part of the surface atoms, and three atoms were left at the tip of the probe. An FIM image obtained at that time was shown in FIG. 12. The osmium probe in this state was transferred to the STM shown in FIG. 1, and the probe was set on the scanning probe microscope as probe 8 shown in FIG. 1. Normal STM measurement was performed with a graphite sample used as sample 1. As a result, an STM image shown in FIG. 13 was measured over 40 minutes with no change. The fact that the resolution of the image did not change at all means that the atoms at the tip of the probe were stable.

A third probe was formed of lanthanum boride ($LaB_6$) in the following manner.

Figure 14:
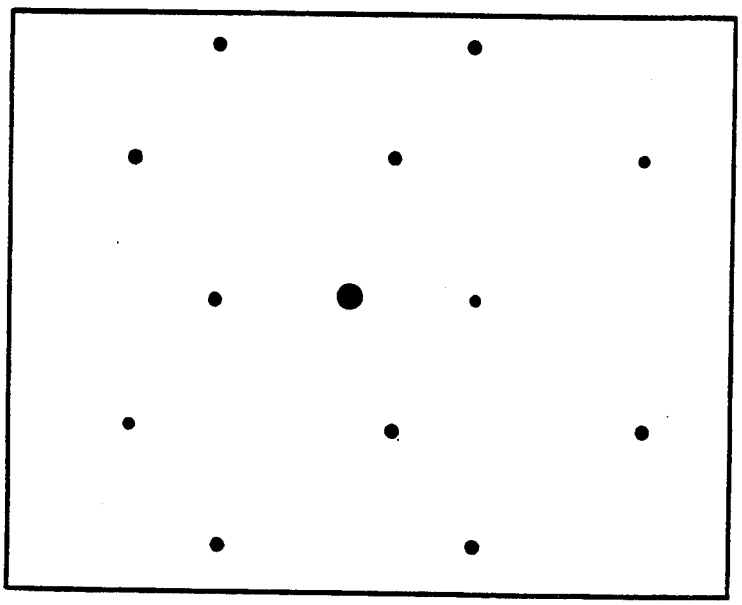
FIG. 14 shows an FIM image of a lanthanum boride probe according to the second embodiment of the invention.

The $LaB_6$ probe was formed by using a material having a size of 1 mm×1 mm×2 mm. The probe was cut out from the material such that the plane of 1 mm×1 mm became a (100) plane. Using the apparatus shown in FIG. 9, this material was immersed in a 40% $HNO_3$ electrolyte such that the (100) plane was in parallel to the level of the electrolyte. While a voltage of AC 5 mV was applied, the tip of the material was electrolytically polished and the probe was formed. The probe was held by a stainless steel pipe, and the atoms at the tip of the probe were observed by an FIM by using He gas. Then, 4th symmetric (100) plane was observed, and four atoms were present at the tip of the probe. Further, voltage was applied to electrolytically evaporate part of the surface atoms, and three atoms were left at the tip of the probe. An FIM image obtained at that time was shown in FIG. 14. The FIM apparatus is directly coupled to the STM shown in FIG. 1 and is able to transfer the probe to the STM in a very high vacuum atmosphere, without exposing the probe to the air.

Figure 15:
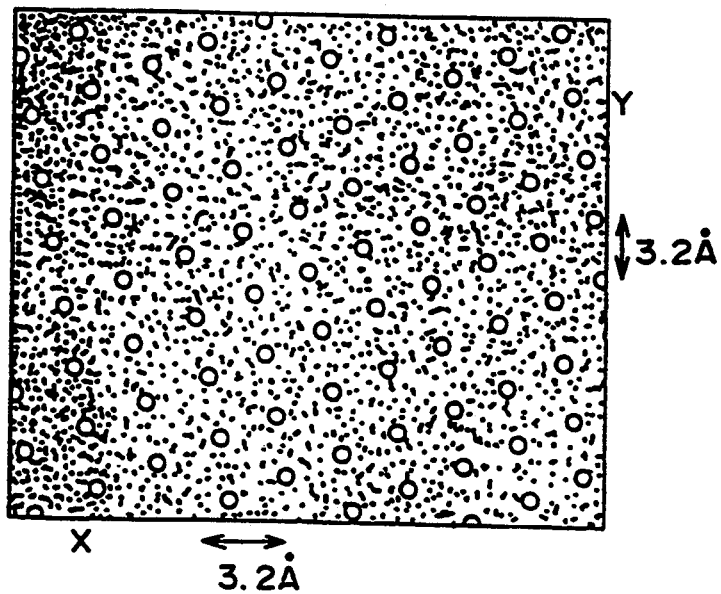
FIG. 15 shows an STM measurement image of a graphite sample obtained by the scanning tunneling microscope with the lanthanum boride probe according to the second embodiment being used.

The probe shown in FIG. 9 was set on the scanning probe microscope as probe 8 shown in FIG. 1. Normal STM measurement was performed with a graphite sample used as sample 1. As a result, an STM atom image shown in FIG. 15 was measured over 90 minutes with no change. The fact that the resolution of the image did not change at all means that the atoms at the tip of the probe were stable.

In addition, after the measurement, a current of 1.5 A was supplied to the heater 2 shown in FIG. 1 and STM measurement was carried out with the graphite sample 1 kept at 600° C. As a result, the heat drift was high and 6 nm/min, as compared to 0.5 nm/min measured at room temperature. However, an STM image was measured over 30 minutes with no change. This means that the STM measurement was performed at high temperature of 600° C. while the atoms at the tip of the probe were stable during scanning.

A third embodiment of the scanning probe microscope of the invention will now be described. The principal structure of the third embodiment is the same as that of the first embodiment shown in FIG. 1, and a description thereof is omitted.

Figure 16:
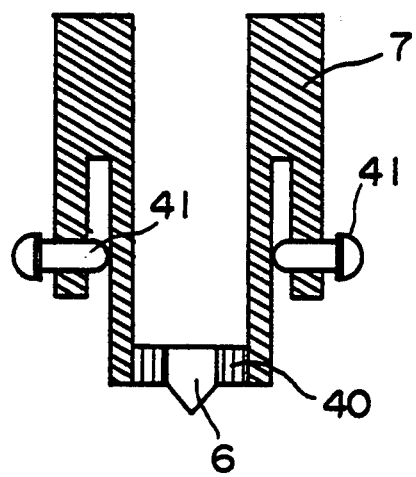
FIG. 16 shows the structure of a heater of a probe holder unit according to a third embodiment of the invention.

As is shown in FIG. 16, the scanning probe microscope of the third embodiment is characterized in that a probe holder 7 is provided with a heater 40 for heating a probe 6. Referring to FIG. 16, the heater 40 is formed of pyrolyric graphite, and the probe 6 is formed of $LaB_6$. The heater 40 and probe 6 are fixed by pressure-adjusting screws 41.

X- and Y-piezoelectric elements 3 and 4 (not shown) were manufactured in the same procedures as in the first embodiment.

Figure 17:
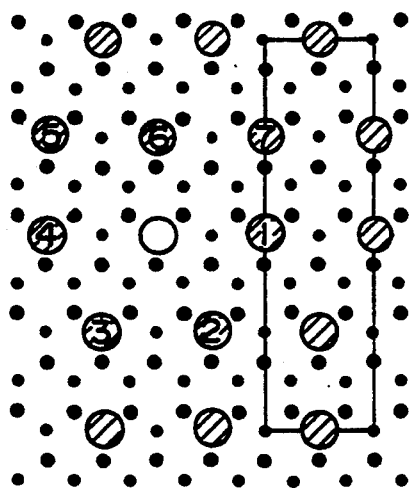
FIG. 17 is a schematic view showing a Ge (111)-C (2×8) structure adsorbed by Pb atoms.

A Ge wafer of (111) plane was set as sample 1 on the scanning probe microscope, and STM observation was conducted. A Ge (111)- C (2×8) structure was confirmed. Then, In atoms were deposited to a thickness of 0.05 ML. The resultant structure was annealed at about 100° C., and STM observation was conducted once again. The observation result is schematically shown in FIG. 17. A white circle indicates an In atom, large black circles indicate Ge atoms of the topmost surface (first layer), and small black circles indicate Ge atoms of the second and following layers. Then, the temperature of the sample 1 was raised to 200° C., and the probe was fixed at the position of Ge(1) in FIG. 17. The distance between the probe and Ge(1) was kept at 0.6 nm. After a voltage of 50 mV was applied to the probe for 10 sec, STM observation was conducted but the STM image did not change. Subsequently, similar scanning was performed while a current of 30 mA was supplied to the probe heater, and then STM observation was conducted. It was found that the atomic position of Ge(1) was empty. The STM observation was continued subsequently, and after three minutes it was confirmed that a Pb atom was shifted to the position of Ge(1). Further, the probe was fixed at the position of Pb in FIG. 17 and a current of 60 mA was supplied to the probe heater for 10 sec, and thereafter STM observation was conducted. It was found that a Ge atom was put in the original Pb position. That is, it was confirmed that the Ge atom, which had moved to the probe, returned to the Ge wafer.

In the very fine processing by control of atoms, as was performed in the third embodiment, atomic movement occurs between the probe and the sample 1. In this processing process, it is possible that an atom of the probe is mixed in the sample 1. For this reason, a high melting point metal is normally used as probe material. However, when the sample 1 is formed of a single elemental material, as in the first embodiment, it is desirable that the probe be made of the same material as sample 1.

A microscope similar to that of the first embodiment was manufactured by using the Ge probe.

In this case, the current to the heater for the probe was limited to 10 mA or less. Thus, atomic movement similar to that of the first embodiment was achieved.

In the above embodiments, the single crystal piezoelectric element was formed of lithium niobate, but it may be formed of lithium tantalate. In addition to these, single crystal materials having high Curie points may be used. In the embodiments, all X-, Y- and Z-piezoelectric elements were formed of single crystals. However, when the heating temperature of the sample is not so high, only the piezoelectric element closest to the sample may be formed of a single crystal. Further, in the above embodiments, X-, Y- and Z-piezoelectric elements were independent elements, but a single piezoelectric element may be used for X-, Y- and Z-directional movement.

The material of the electrodes is not limited to silver, and it may be any metal.

In the above embodiments, the X- and Y-piezoelectric elements were connected to the sample, and the Z-piezoelectric element was connected to the probe. However, the relationship between the piezoelectric elements, on the one hand, and the sample and probe, on the other hand, may be freely chosen. Furthermore, as means for heating the sample or probe, the sample holder or probe holder was provided with a heater. Instead, an infrared lamp or laser may be used to radiate light on the surface of the sample.

In the above embodiments, rhenium, osmium and lanthanum boride were employed as probe materials, but a compound metal or a compound semiconductor including rhenium or osmium, such as rhenium silicide, may also be employed.

The scanning probe microscope of the present invention is applicable not only to the STM but also to a capacitance microscope or an atomic force microscope (AFM).

Needless to say, the present invention is not limited to the above embodiments, and various modifications may be made without departing from the spirit of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scanning probe microscope comprising a probe situated to face the surface of an sample, and driving means for moving the sample and the probe relative to each other in a first direction perpendicular to the surface of the sample and moving the probe and the sample relative to each other in second and third directions perpendicular to the first direction,
   wherein the probe is formed of any one selected from the group consisting of rhenium, and lanthanum boride.

2. The microscope according to claim 1, further comprising heating means for heating the sample.

3. The microscope according to claim 2, wherein said heating means includes at least one of a resistance coil and light radiation means.

4. The microscope according to claim 1, wherein the driving means comprises at least one piezoelectric element formed of a piezoelectric single crystal.

5. A scanning probe microscope comprising a probe situated to face the surface of a sample, and driving means for moving the sample and the probe relative to each other in a first direction perpendicular to the surface of the sample and moving the probe and the sample relative to each other in second and third directions perpendicular to the first direction,
   wherein said scanning probe microscope further comprises: first heating means for heating the sample; and second heating means for heating the probe, wherein the probe is formed of any one selected from the group consisting of rhenium, osmium and lanthanum boride.

* * * * *